May 18, 1954  E. L. CALDWELL, JR  2,678,550
ROTARY DRIVING UNIT
Filed Sept. 15, 1952
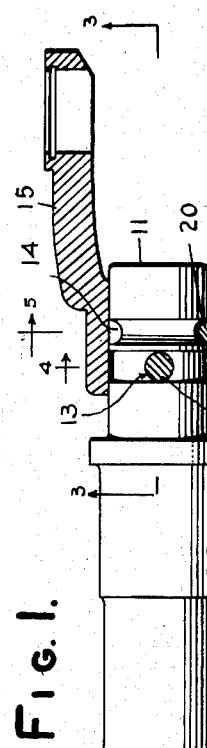
Fig. 1.
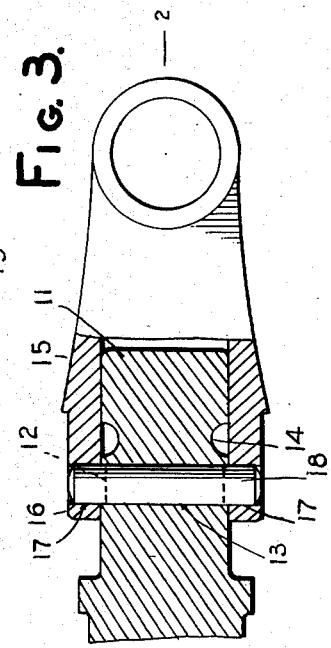
Fig. 2. Fig. 3.
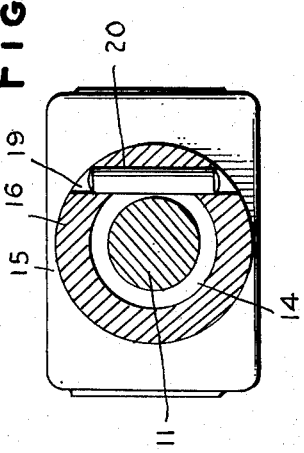
Fig. 5.
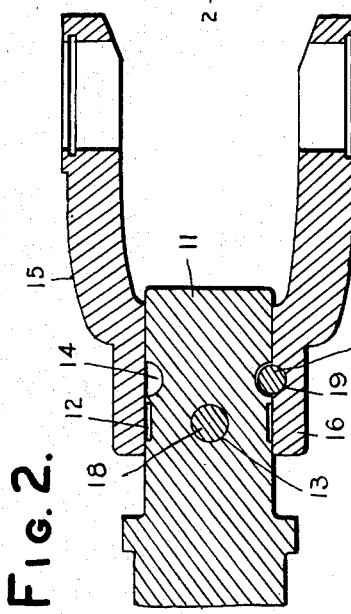
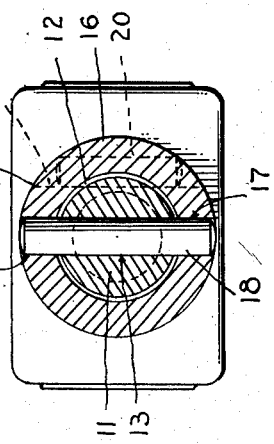
Fig. 4.
INVENTOR.
EDWARD L. CALDWELL, JR.
BY Patented May 18, 1954

2,678,550

UNITED STATES PATENT OFFICE 2,678,550

ROTARY DRIVING UNIT

Edward L. Caldwell, Jr., Corpus Christi, Tex., assignor to E. L. Caldwell & Sons, Corpus Christi, Tex., a firm Application September 15, 1952, Serial No. 309,607

4 Claims. (Cl. 64—28)

My invention relates to a rotary driving unit and has particular reference to a construction wherein a shear pin connects driving and driven members.

An important object of the invention is to provide means of the above-mentioned character so constructed that the shear pin will be severed when the load placed upon the driven member exceeds a predetermined limit and the severed shear pin will not gauld or chafe the driving member or driven member.

A further object of the invention is to provide means including the stay pin for holding the driving and driven members in the assembled relation when the shear pin is severed and permitting of relative rotation between the same.

A further object of the invention is to provide a device of the above-mentioned character which is of simple construction, cheap to manufacture and convenient to manipulate.

Other objects and advantages of the invention will be apparent during the course of the following description.

In the accompanying drawings, forming a part of this application and in which like numerals are employed to designate like parts throughout the same, Figure 1 is a plan view of the assembled rotary driving and driven members, parts being shown in horizontal section, Figure 2 is a horizontal section taken on line 2—2 of Figure 3, Figure 3 is a vertical section taken on line 3—3 of Figure 1, Figure 4 is a transverse vertical section taken on line 4—4 of Figure 1, and, Figure 5 is a similar view taken on line 5—5 of Figure 1.

In the drawings, where for the purpose of illustration is shown a preferred embodiment of the same, the numeral 10 designates a rotary shaft or driven member which is to be mounted in a suitable bearing. This shaft includes a cylindrical extension 11. This cylindrical extension is provided with an annular groove 12, preferably about .004 inch deep. The extension 11 has a cylindrical diametrically extending opening 13 leading at its opposite ends into the groove 12. The extension 11 is provided with an annular groove 14, which is substantially semi-cylindrical in cross section and disposed upon one side of the groove 12, and spaced therefrom, as shown. The numeral 15 designates the driving member, which may be in the form of a yoke. This yoke is included in a universal connection and the universal connection is connected with a suitable source of power to rotate the member 15. The driving member or yoke 15 includes a sleeve or hub 16, which is mounted upon the extension 11 and is free to rotate thereon when the shear pin is severed. The sleeve or hub 16 has radially disposed openings 17 formed therein, for receiving a shear pin 18, also extending through the opening 13. This sheer pin passes through the annular groove 12. The shear pin may have a driving fit within the openings 17 and 13 so that it will stay in position, when inserted into these openings. The shear pin 18 normally connects the driving and driven members 15 and 10 so that they rotate as a unit. The sleeve or hub 16, Figure 5, is provided with an opening 19, in alignment with the annular groove 14 and at a tangent thereto. The opening 19 leads into the annular groove 14 and the opening 19 receives a stay pin 20, the inner side of which projects into the annular groove 14. The pin 20 and annular groove affords a swiveled connection between the sleeve or hub 16 and the extension 11, to hold these parts against relative axial displacement but permitting of relative turning movement when the shear pin is severed.

The operation of the device is as follows:

When the driving member or yoke 15 is rotated, this rotation is imparted to the driven member 10 through the shear pin 18, and the driving and driven members rotate as a unit. When the load upon the driven member 10 exceeds a predetermined limit, the shear pin 18 will be severed and the driving member 15 is now free to rotate with respect to the driven member. When the shear pin 18 is severed, it will not gall or chafe the sleeve or hub 16 or extension 11, since the annular groove 12 provides a slight clearance between the line of severance of the shear pin and the inner face of the sleeve or hub 16 and the outer face of the extension 11. When the shear pin is severed, the stay pin 20 operating within the annular groove 14 will permit the driving member 15 to rotate with respect to the extension 11, but will hold these parts against relative axial movement so that the driving and driven members remain assembled.

It is to be understood that the form of my invention herewith shown and described is to be taken as a preferred example of the same and that various changes in the shape, size and arrangement of parts may be resorted to, without departing from the spirit of my invention or the scope of the subjoined claims.

Having thus described my invention, I claim:

1. An operating unit comprising, a rotary member provided with a shallow circumferentially extending groove and a transverse opening leading into the groove, a second rotary member including a part having a main opening to rotatably receive the first rotary member, said part having a transverse opening, a shear pin held within the transverse opening of the first rotary member and passing through said shallow groove and extending into the transverse opening of said part, the arrangement being such that the shallow groove receives the metal dust or flakes caused by the shearing of the shear pin.

2. An operating unit, comprising a rotary member which is circular in cross-section and provided with a shallow annular groove and a radial opening leading into the groove, a sleeve rotatably receiving the rotary member and having a radial opening, a shear pin held within said radial openings and extending through said groove, and detachable means directly connecting said member and sleeve to prevent relative axial movement and permit of relative rotary movement, the arrangement being such that the shallow groove receives the metal dust or flakes caused by the shearing of the shear pin.

3. An operating unit comprising, a rotary member which is circular in cross-section and provided with an annular groove which is about .004 of an inch deep, said rotary member having a radial opening which leads into the groove, a sleeve rotatably receiving the rotary member and having a radial opening, a shear pin held within the radial openings and passing through said groove, the arrangement being such that the groove receives the metal dust or flakes caused by the shearing of the shear pin.

4. An operating unit comprising, a rotary member which is circular in cross-section and provided with a shallow annular groove which is about .004 of an inch in depth, said rotary member having a radial opening leading into said groove, said rotary member having a second annular groove disposed axially of the shallow annular groove, a sleeve rotatably receiving said rotary member and having radial openings for alignment with the shallow groove, a shear pin passing through the radial opening of the rotary member and the radial openings of the sleeve and the shallow groove, the sleeve having transverse openings arranged axially of the radial openings of the sleeves and leading to the second annular groove, and a stay pin passing through the transverse openings and the second annular groove to hold the rotary member and sleeve against relative axial movement and permit of their relative rotary movement.

References Cited in the file of this patent

UNITED STATES PATENTS

| Number | Name | Date |
|---|---|---|
| 1,849,174 | Carter | Mar. 15, 1932 |
| 2,388,186 | Rowsey | Oct. 30, 1945 |